3,190,610
SELF-CLEANING ROTARY VALVE FOR CONTROLLING FLOW OF AEROSOLS

George W. Dingus, Pampa, Tex., assignor to Cabot Corporation, Boston, Mass., a corporation of Delaware
Filed Sept. 27, 1961, Ser. No. 141,044
3 Claims. (Cl. 251—173)

This application relates to rotary valves. More particularly the invention described herein relates to a rotary valve of a novel design which is especially suitable for controlling the flow of hot gases or aerosols with low pressure differentials.

Many commercial processes involve high temperature reactions and accordingly require the use of rotary valves to control the flow of gaseous reactants and gaseous products or aerosols resulting therefrom. One such commercial process is the thermal process for the production of carbon black. Briefly, in the production of thermal carbon blacks a commercial plant generally comprises two generators each operating in alternating cyclic fashion. In one half of the cycle, the brick checker work of one generator is heated while in the other half of the cycle the so heated checker work "cracks" a hydrocarbon gas into carbon black and a gaseous by-product, mostly hydrogen. The products of the two generators are discharged alternatively—generally for five minute intervals—into a common collection system. Accordingly, the ducts leading from each generator to the collection system must be alternately closed and opened according to whether the particular generator is heating or "cracking." The valves which alternately open and close the ducts are generally rotary valves—but may sometimes be slide valves—and are referred to as "hot valves" since their environmental temperature is from 600 to 1000° F. or in some cases substantially higher.

Considerable difficulty has consistently been encountered in the efficient operation of these "hot valves" in the thermal and other such processes. This difficulty stems from two factors either of which alone would severely limit the efficiency of any type of valve operating under such conditions. First, especially when a rotary valve is involved, the unusually high environmental temperature causes serious distortion of either the vane thereof or of the surrounding body or both and thereby seriously impairs the sealing efficiency thereof. Secondly, when the "hot valve" is used to control the flow of a hot aerosol, the gas borne solids usually have a tendency to deposit on the valve seats and in other places where the resulting deposits build up and gradually become compacted. For example, in the aforementioned Thermal Process the gas borne thermal carbon black which is relatively dense and extremely sticky continually builds up at such points about the valves presently used, eventually forming a hard cake or accretion. This causes serious jamming and/or prevents the complete closing of the conventional valves used and frequent shut downs are required to remove the deposits at fault. Accordingly, it would be most desirable to have a rotary valve capable of efficiently operating under adverse temperature conditions and so designed that the operation of the valve continually removes deposits which might otherwise adversely impair the sealing efficiency thereof.

The principal object of the present invention is to provide a rotary valve which is capable of efficiently operating under conditions of high temperatures.

Another object of the present invention is to provide a rotary valve which prevents the build up of gas borne particles especially on the seating surfaces thereof.

Still another object of the present invention is to provide a rotary valve wherein the seating surface thereof may be continually maintained in a clean fashion without costly dismantling thereof and the concomitant undesirable down time.

Still other objects of the present invention will in part be obvious and/or will in part appear hereinafter.

The above objects and advantages of the present invention are realized by a novel integration of design features to produce a rotary valve which is surprisingly effective for controlling the flow of hot gases and especially hot aerosols.

The novel features of my rotary valve are best illustrated by the attached drawing in which the figure is a schematic cross-sectional view of an arrangement of apparatus which represents the preferred embodiment of my invention.

Referring now to the figure, the rotary valve described therein consists of a thin walled cylindrical metal body 12 which is securely attached substantially concentrically within conduit 10 by spacer rings 16 so as to form a continuous gas tight annular chamber 14. Gas tight chamber 14 constitutes an element especially contemplated in the preferred embodiment of my invention. A substantially straight rotatable shaft 20 of circular cross-section transversely passes through that inner portion of conduit 10 occupied by body 12. Shaft 20 is supported by guide bushings 26 and 28 positioned diagonally opposite each other on conduit 10. The bodies of said bushings are set in openings in the wall of conduit 10 in gas tight relationship therewith and so that the inner passages through said bushings are aligned with each other. Guide bushings 26 and 28 provide a gas tight seal about the portions of shaft 20 which extend therethrough by means of packings 27 and packing nuts 29. The axis of shaft 20 (M—M) intersects the axis F—F of body 12 at point 24 and the angle of this intersection in turn fixes the angle at which the closing vane 18 must be attached to the shaft 20. In the preferred illustrated embodiment of my invention the angle formed by the intersection of the axis of shaft 20 (M—M) with the axis F—F is about 45°.

Vane 18 is a flat, circular, metal vane and when being installed is attached securely to shaft 20 by means of bushing 36 (having keys or other locking devices 30) or by direct welding, 38, brazing or other suitable means preferably in its closed position, that is so that all of the radii thereof are at right angles to axis F—F. In any case, vane 18 is mounted on shaft 20 so that the center of vane 18 coincides approximately with point 24 where the axis (M—M) intersects axis F—F. Line J—J is a chord of vane 18 which passes through the center thereof and which lies in the same plane as axis M—M and axis F—F when vane 18 closes body 12. Accordingly, when vane 18 is in its closed position, the angle formed between J—J and M—M at point 24 will equal 90° minus the magnitude of the angle formed by the intersection of M—M and F—F. It will be readily seen that when vane 18 is disposed on shaft 20 in the manner described, then at some point in the rotation of shaft 20 all of the radii of vane 18 must be at right angles to F—F and at this point, vane 18 completely closes body 12. Circular vane 18 is generally slightly larger in diameter than the diameter of body 12 thereby insuring a substantially gas tight seal due to the resulting interference fit when vane 18 is in closed position at right angles across conduit 10.

Also the circumferential portion of vane 18 may be tipped with a ring 40 of a heat resistant non-metallic material such as carbon, graphite, etc., to prevent any excessive galling of the surface of body 12.

The magnitude of the internal angle formed at point 24 by the intersection of F—F and axis M—M of shaft 20 when vane 18 is mounted thereon is a critical feature of my invention since the closer this angle is to 45°, the larger will be the inner area of body 12 which will be scraped clean as the valve rotates and the greater will be the open cross-sectional area of the passageway when the valve is at its most open position. When exactly 45°, vane 18 will scrape and clean out a large area of body 12 while moving from a full closed position as illustrated in FIGURE 1 to a full open position which coincides with the horizontal plane through axis F—F as shaft 20 is rotated through 180°. Obviously in some cases, the angle formed by the intersection of M—M and F—F may be varied somewhat from that of 45°, as, for example, when the full area of the conduit passage is not needed when fluids are flowing. In turn, the angle formed between M—M and F—F is determined by the alignment of guide bushings 26 and 28 which may be disposed on conduit 10 so that they are aligned at any angle relative to the axis F—F of the conduit from as low as about 30° to as high as about 60°. Under such conditions however, that is, when the angle between M—M and F—F is either greater or less than 45°, rotation of shaft 20 through 180° will move vane 18 from a full closed position to only a partially open position. Obviously regardless of whatever angle between 30° and 60° at which the axis of shaft 20 is disposed relative to F—F, the internal angle formed between J—J and M—M when vane 18 closes body 12 will always equal 90° minus the magnitude of the angle formed between M—M and F—F. However, the strongly preferred mounting of vane 18 on shaft 20 is as illustrated in FIGURE 1 wherein the angles formed are approximately 45° both between M—M and F—F and between M—M and J—J.

Also in the preferred embodiment of my invention shaft 20 has only one direction of rotation. By this feature, especially when vane 18 makes an interference fit with body 12, the circumferential portion of vane 18 will continually scrape and clean away from the major areas of the inner surface of valve body 12 any sticky solid product which may deposit thereon.

Another feature in the especially preferred embodiment of my invention is the pressuring of the gas tight chamber 14 (when such is present) through gas inlet 24 so as to flex body 12 slightly inward towards the center of conduit 10. The flexing of body 12 not only improves the sealing efficiency of my valve, but also aids in removing any foreign matter which might interfere with the efficiency thereof. The flexing of body 12 also reduces the criticality of tolerances between vanes 18 and body 12 especially when irregular expansion therebetween occurs. Accordingly, body 12 may be continually maintained under back pressure in chamber 14 insuring a gas tight seal when vane 18 is closed and providing vane 18 a better opportunity while rotating to scrape off any adhering solids on body 12. Alternatively, the body may be maintained under back pressure only when vane 18 is a closed position, thereby insuring a substantially gas tight seal in conduit 10. Also body 12 may be intermittently subjected to back pressure in order to accentuate the normal flexing action and assist in spalling off any deposits of solids that may build up thereon.

Hereafter follows an example of a specific rotary valve of substantially the same construction as described in FIGURE 1. This example is illustrative in nature and in no way should it be construed to limit the scope of the present invention.

*Example 1*

In a conventional thermal furnace unit consisting of two generators, a conventional butterfly valve, closing at an angle of 75° to the axis of the pipe, is installed in one outlet duct while a rotary valve similar to that of FIGURE 1 is installed in the other outlet duct in order to compare the performance of each. The temperature in each of the ducts is about 650° F. The rotary valve of similar construction to that of FIGURE 1 comprises a body 12 of a stainless steel tubing about 13 inches in width and of 0.015/0.020 inch wall thickness which is cold sized to a 15.996/16.000 inch I.D. This stainless steel shell is secured inside a conduit having a 17.5 inch O.D. and a wall thickness of about 0.25 inch by means of spacer rings which are similar to 16 of FIGURE 1 in a manner so that a substantially gas tight chamber (14) is formed. A stainless steel vane similar to vane 18 is attached in th manner illustrated in FIGURE 1 to a rotatable shaft which is similar to shaft 20. The outside diameter of the vane is 16.000/16.005 inches so that an interference fits results between the vane and body 12. The shaft 20 makes an angle of 45° with the axis of the body 12 so that vane 18 moves from a full closed to a full open position when the shaft is turned through the first half revolution and back to full closed again when the full revolution is completed. In this valve, pressurized air is admitted to the gas tight chamber between the body of the valve and the shell to thereby flex the body of the valve intermittently (every 5 minutes). In 18 weeks of operation under the usual operational conditions, actual down time required to clean, repair or replace the conventional butterfly valve amounted to about 40 hours. In all cases however, almost immediately upon resuming operations, the inferior quality of product and production rate thereof in the duct containing the conventional valve indicated that the seal effected thereby was partially ineffective. In contrast thereto, no down time for such repairs is required nor any ineffective sealing noted with the rotary valve described above.

Since the essence of my invention involves the novel integration of design features to produce a rotary valve capable of effectively operating under adverse conditions many incidental modifications thereof are contemplated within the scope of my invention. Accordingly, changes in material, applications, means and direction of rotation and other features or operational conditions may be introduced without departing from the scope of my invention.

Having described my invention what I declare as new and desire to secure by U.S. Letters Patent is as follows:

1. Apparatus for controlling the flow of hot gases and aerosols comprising a conduit, a substantially cylindrical, continuous metal body concentrically positioned within said conduit so as to form a chamber between said conduit and said body, means for concentrically positioning said body in said conduit, means for forming a gas tight seal between said conduit and said body, means for admitting a gas into said chamber and releasing said gas therefrom, a rotatable shaft extending transversely through said body so that the axis of said shaft intersects the horizontal axis of said body at an angle between 30° and 60° but so that said shaft does not pass through said chamber, a circular metal vane of substantially the same diameter as the inside of said body, said vane being attached securely to said shaft and mounted thereon in such a manner that the center of said vane coincides with the point of intersection of the axis of said shaft and the axis of said body and so that at some point during the rotation of said shaft, all of the radii of said vane are at right angles to the axis of said body, means for rotating said shaft, and means for maintaining a gas tight seal about said shaft at the points where it extends through said conduit.

2. Apparatus of claim 1 in which the axis of said shaft intersects the axis of said body at an angle of about 45 degrees.

3. Apparatus of claim 1 in which the means for rotating said shaft permits rotation in only one direction.

References Cited by the Examiner

UNITED STATES PATENTS

| | | | |
|---|---|---|---|
| 2,673,708 | 3/54 | Danks | 251—173 |
| 2,754,846 | 7/56 | Ray | 251—306 XR |
| 3,027,133 | 3/62 | Anderson | 251—173 |
| 3,078,069 | 2/63 | Broadbent | 251—173 |

FOREIGN PATENTS

| | | |
|---|---|---|
| 1,175,074 | 11/58 | France. |
| 1,245,175 | 9/60 | France. |
| 869,272 | 5/61 | Great Britain. |

ISADOR WEIL, *Primary Examiner.*

CLARENCE R. GORDON, WILLIAM F. O'DEA,
*Examiners.*